United States Patent
Chartrel et al.

(10) Patent No.: US 11,174,416 B2
(45) Date of Patent: Nov. 16, 2021

(54) PROCESS FOR HOT APPLICATION OF A SILYLATED ADHESIVE COMPOSITION

(71) Applicant: BOSTIK SA, La Plaine Saint Denis (FR)

(72) Inventors: Jean Francois Chartrel, Cuts (FR); Olivier Laferte, Trosly Breuil (FR); Lahoussaine Lalouch, Noyon (FR)

(73) Assignee: BOSTIK SA, Colombes (FR)

( * ) Notice: Subject to any disclaimer, the term of this patent is extended or adjusted under 35 U.S.C. 154(b) by 776 days.

(21) Appl. No.: 14/574,555

(22) Filed: Dec. 18, 2014

(65) Prior Publication Data

US 2015/0175849 A1 Jun. 25, 2015

(30) Foreign Application Priority Data

Dec. 19, 2013 (FR) ...................................... 1363079

(51) Int. Cl.
*C09J 5/06* (2006.01)
*B01F 15/06* (2006.01)
(Continued)

(52) U.S. Cl.
CPC ............... *C09J 5/06* (2013.01); *B01F 5/0451* (2013.01); *B01F 5/0619* (2013.01);
(Continued)

(58) Field of Classification Search
CPC .... B01F 15/068; B01F 2215/0062; C09J 5/06
See application file for complete search history.

(56) References Cited

U.S. PATENT DOCUMENTS

| 4,650,387 A | * | 3/1987 | Busch | .................. B05C 5/0216 156/69 |
| 4,692,352 A | * | 9/1987 | Huddleston | ........... B29C 47/527 427/208.4 |

(Continued)

FOREIGN PATENT DOCUMENTS

| CN | 101679822 A | 3/2010 |
| EP | 1508384 A2 | 2/2005 |

(Continued)

OTHER PUBLICATIONS

Machine trasnlation of WO 2005/053826 A2, Jun. 2005.*

(Continued)

*Primary Examiner* — Francisco W Tschen
(74) *Attorney, Agent, or Firm* — Millen, White, Zelano and Branigan, P.C.

(57) ABSTRACT

A process for hot application of an adhesive composition (80) on a support (96), by means of a nozzle (50) applying the adhesive composition (80), a line (88) supplying the nozzle (50) with the adhesive composition (80) to be applied in fluid form, a mixer (30) positioned in the line (88) for the homogeneous mixture of the main components of the adhesive composition before its application; the applied adhesive composition (80) including a silylated prepolymer, a compatible tackifying resin; the adhesive composition having a cross-linking catalyst; the process involving: supplying the line (88) with the silylated prepolymer separated from the cross-linking catalyst, the mixing of the cross-linking catalyst with the main components by the mixer (30), the hot application of the mixed adhesive composition (80) onto a support (96).

15 Claims, 2 Drawing Sheets

(51) Int. Cl.
  *B05D 1/34* (2006.01)
  *B05C 11/10* (2006.01)
  *C08G 18/83* (2006.01)
  *C09J 175/04* (2006.01)
  *B01F 5/04* (2006.01)
  *B01F 5/06* (2006.01)
  *C08G 65/336* (2006.01)
  *B05D 1/26* (2006.01)
  *B05C 5/02* (2006.01)

(52) U.S. Cl.
  CPC .......... *B01F 15/068* (2013.01); *C08G 18/837* (2013.01); *C08G 65/336* (2013.01); *C09J 175/04* (2013.01); *B01F 2005/0637* (2013.01); *B01F 2015/062* (2013.01); *B01F 2215/0062* (2013.01); *B05C 5/0254* (2013.01); *B05C 11/1042* (2013.01); *B05D 1/26* (2013.01); *B05D 1/34* (2013.01); *B05D 2252/02* (2013.01); *C09J 2475/00* (2013.01)

(56) References Cited

U.S. PATENT DOCUMENTS

| | | | | |
|---|---|---|---|---|
| 4,729,664 | A | * | 3/1988 | Kamiwano ............... B01F 9/06 366/220 |
| 4,756,625 | A | * | 7/1988 | Schultz ............... B01F 7/00775 366/149 |
| 4,835,021 | A | | 5/1989 | Fronheiser |
| 4,884,894 | A | * | 12/1989 | Hashimoto ........... B01F 5/0656 366/338 |
| 8,802,777 | B2 | | 8/2014 | Zollner et al. |
| 2003/0179648 | A1 | * | 9/2003 | Heusser ............... B01F 5/0641 366/336 |
| 2004/0196734 | A1 | * | 10/2004 | Mehta ...................... B01F 3/10 366/138 |
| 2005/0074553 | A1 | | 4/2005 | Takahashi et al. |
| 2007/0249761 | A1 | * | 10/2007 | Guymon ............ B65D 21/0223 524/59 |
| 2012/0012420 | A1 | * | 1/2012 | Classen ............... A47L 15/4246 181/294 |
| 2013/0299074 | A1 | | 11/2013 | Chartrel et al. |
| 2014/0014683 | A1 | * | 1/2014 | Owen .................. B05C 11/1042 222/54 |

FOREIGN PATENT DOCUMENTS

| | | | |
|---|---|---|---|
| WO | 05053826 A2 | | 6/2005 |
| WO | WO2005/053826 | * | 6/2005 |
| WO | 2012/090151 A2 | | 7/2012 |
| WO | 12090151 A2 | | 7/2012 |
| WO | WO 2012090151 A2 | * | 7/2012 ............. B65H 20/20 |

OTHER PUBLICATIONS

Westfall 2800 Static Mixer Brochure, Available online Mar. 21, 2011, Retrieved on Aug. 13, 2019, pp. 1-4 (Year: 2011).*
Westfall 2800 Static Mixer Brochure, Available online Mar. 31, 2011, Retrieved on Aug. 13, 2019, pp. 1-4 (Year: 2011) (Year: 2011).*
E. von Seggern et al., "Spin Coating of Rolls and Tubes with Highly Reactive Polyurethane Systems", XP-00958438 (1999) pp. 1-5.
Elke von Seggern, et al., "Reaktiv Beschichten", XP-00958438 (1999) pp. 144-149.
FRP Machinery and Equipment, Edition 1 (1987) East China Institute of Chemical Technology, China Building Industry Press; pp. 21-22.
Zhang, Rui-zhi, China Textile; Polymer Material Production and Processing Equipment, Edition 1 (1994) pp. 41-43.
Search report and Office Action in corresponding CN 201410785718.6 dated Jan. 28, 2019 (pp. 1-21) (pp. 1-6) and English translations of Office action (pp. 1-4) and Search report (pp. 1-3).

* cited by examiner

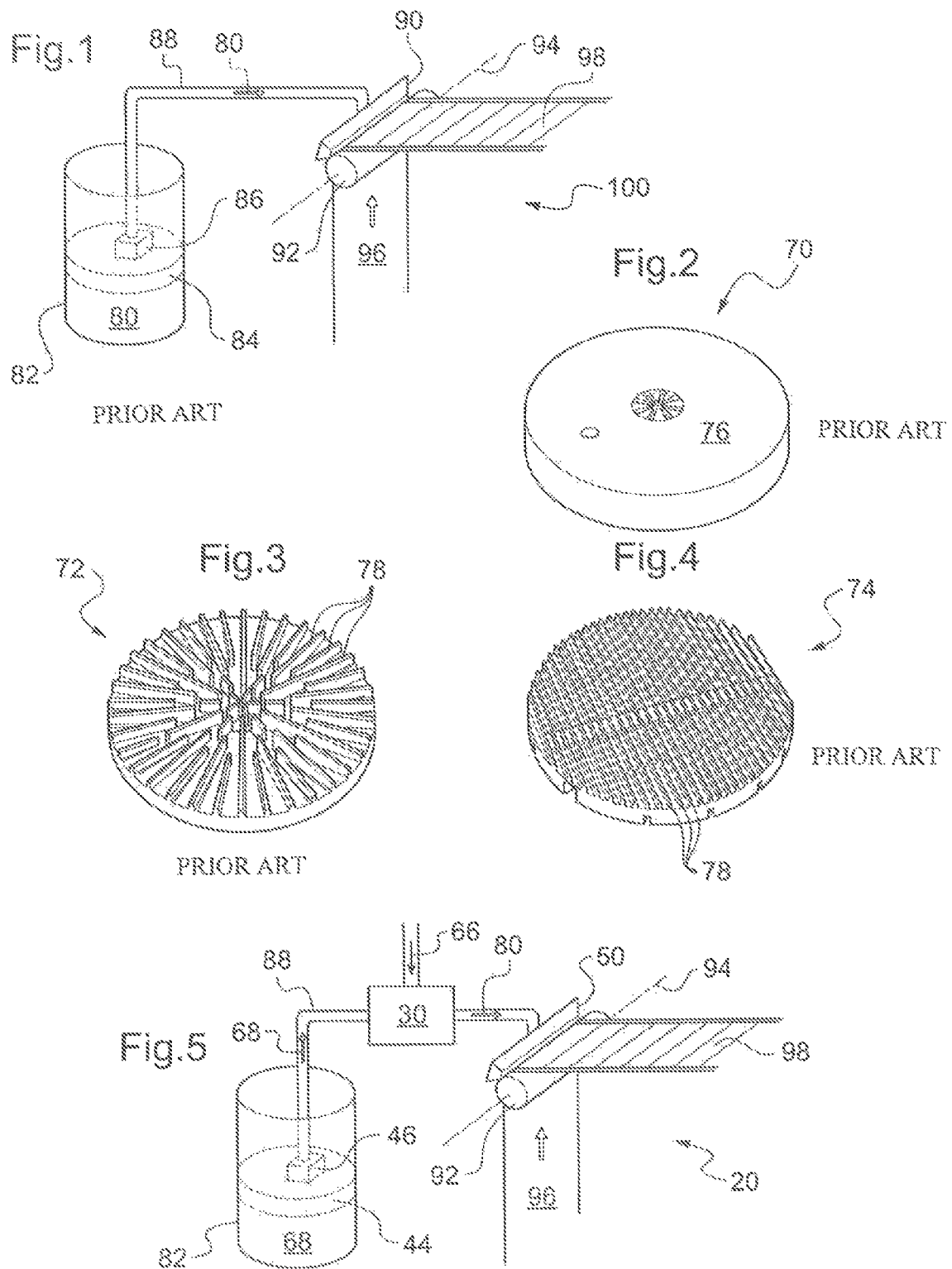

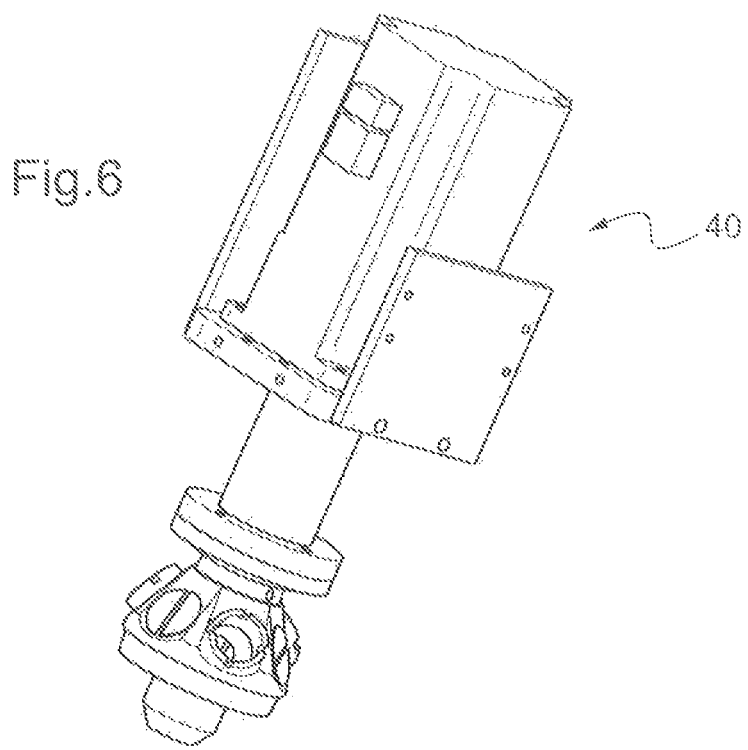
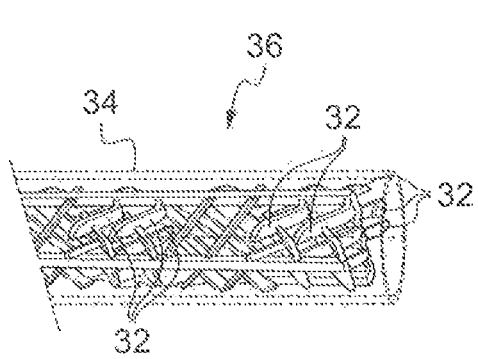
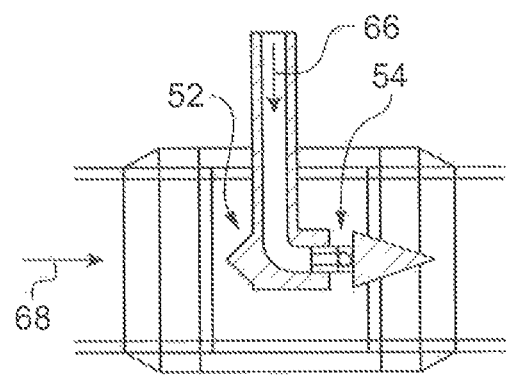
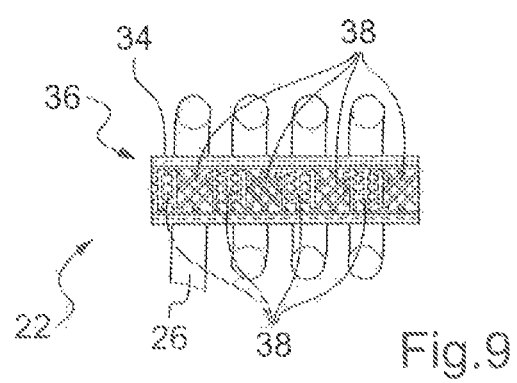

PROCESS FOR HOT APPLICATION OF A SILYLATED ADHESIVE COMPOSITION

The invention relates to a process for hot application of a silylated adhesive composition with separate supply of the main components of the adhesive composition.

In the adhesive industry, adhesive surfaces may be produced by the technique of hot application of the adhesive composition on a surface. FIG. 1 shows a system 100 according to the prior art for hot application of an adhesive composition 80. This system 100 comprises a reservoir 82 for storing the adhesive composition 80, here as a barrel of 200 liters. The adhesive composition 80 is intended to be applied on a surface 96, here a polyester film running on a cylinder 92 with an axis 94. This application is performed by means of a gluing nozzle 90 in order to form an adhesive surface 98. Supplying the adhesive composition to be applied 80 to the nozzle is achieved by means of a fluidic communication line 88 for the adhesive composition between the barrel and the nozzle 90, the line 88 being provided with a pump 86 for circulating the adhesive composition.

In order to facilitate the application by the nozzle 90 and the pumping from the barrel to the nozzle 90, the adhesive composition 80, which may be a highly viscous liquid at room temperature, is for example heated to a temperature from 100° C. to 180° C. in order to have sufficient viscosity. The system 100 then comprises a heater 84 upstream from the pump 86. The heater 84 for example corresponds to a melting plate put into contact with the adhesive composition in the barrel. This melting plate is electrically heated with heating resistors. The amount of heat transmitted from the heater 84 to the adhesive composition 80 notably depends on the exchange surface area between the heater 84 and the adhesive composition 80. With reference to FIGS. 2, 3 and 4, different alternatives of the melting plate may then be contemplated, respectively an alternative 70 with a smooth exchange surface 76 and alternatives 72 and 74 with exchange surfaces having fins 78.

This system 100, however, does not have satisfactory operation in the cases when the adhesive composition 80 to be applied comprises a reactive pre-polymer and has an application temperature, from 100 to 120° C. for example, too close to a cross-linking temperature range from 100° C. to 140° C. for example. Indeed, such an adhesive composition 80 heated in the storage reservoir 82 with a heating target temperature of more than or equal to 100° C. begins to crosslink, and a fortiori in the presence of humidity. Indeed with such a heater 84 in the storage reservoir 82, the residence time of the adhesive composition 80 at 100° C. is poorly controlled on the one hand and the actually applied temperature is also poorly controlled on the other hand. Therefore, there exists a risk of complete cross-linking of the adhesive composition 80 in contact with the fins 78 of the heater 84, resulting in the formation of a compact cross-linked block. Such a cross-linked block may obturate the melting plate 72 or 74 and prevent any circulation of fluid adhesive composition 80 to the application nozzle 90.

This risk of fouling the melting plate 72 or 74 is particularly worsened for adhesive compositions which cross-link with humidity. Indeed, each barrel change exposes the residues of adhesive compositions on the plate to the humidity of the air thus reinforcing the cross-linking of these residues on the plate.

Therefore there exists a need for applying a reactive adhesive composition having an application temperature close to a cross-linking temperature.

More particularly, the invention is directed to providing a system and a process for applying such an adhesive composition.

For this purpose, the present invention proposes a process for hot application of an adhesive composition on a support, by means of a system for hot application of the adhesive composition, the system comprising:
- an application nozzle for applying the adhesive composition,
- a supply line for supplying the application nozzle with the adhesive composition to be applied in fluid form,
- a mixer positioned in the supply line for homogenous mixing of the main components of the adhesive composition before its application;
- the applied adhesive composition including as main components:
- from 20% to 85% by weight, preferably from 30 to 75% by weight of a silylated pre-polymer,
- from 15 to 80% by weight, preferably from 25 to 70% by weight of a compatible tackifying resin;
- the adhesive composition further comprising from 0.01 to 3% by weight, preferably from 0.1 to 2% by weight of a cross-linking catalyst;
- the process comprising:
- supplying the supply line with said at least one silylated pre-polymer separate from the cross-linking catalyst,
- mixing of the cross-linking catalyst with the main components by means of the mixer,
- hot application of the adhesive composition mixed on a support by means of the application nozzle.

According to preferred embodiments, the invention comprises one or more of the following features:
- upon supplying the supply line, the cross-linking catalyst is separated from the whole of the components at the basis of the adhesive composition;
- the mixer is a static mixer, preferably the static mixer includes an electrically conducting material, the hot application system comprising an in-line heating device; upstream from the mixing point of the cross-linking catalyst with the main components and including the static mixer and an inductive coil surrounding the static mixer, this process comprising, prior to hot application, the heating of the adhesive composition up to the application temperature, by electrically powering the inducting coil of the in-line heating device;
- the mixer is a dynamic mixer;
- the adhesive composition to be applied comprises a reactive pre-polymer which cross-links in a temperature range, the adhesive composition to be applied having an application temperature range included in the cross-linking temperature range;
- the adhesive composition to be applied cross-links with humidity;
- the system comprises heater able to be positioned at a storage reservoir comprising at least one of the main components separated for raising said at least one separate main component to a pumping temperature, preferably said at least one separate main component is raised to a pumping temperature comprised between 50° C. and 140° C., preferably comprised between 80° C. and 120° C., more preferably between 100° C. and 110° C.;
- the adhesive composition is applied at a temperature comprised between 50° C. and 140° C., preferably comprised between 80° C. and 120° C., more preferably between 100° C. and 110° C.

Other features and advantages of the invention will become apparent upon reading the description which follows of embodiments of the invention, given as an example and with reference to the appended drawings.

BRIEF DESCRIPTION OF THE FIGURES

FIG. 1 shows a system for applying an adhesive composition according to the prior art.

FIGS. 2, 3 and 4 show different alternatives of the melting plate used in the system of FIG. 1.

FIG. 5 shows a system capable of applying the proposed process for applying an adhesive composition.

FIG. 6 shows an embodiment of the dynamic mixer used in the proposed process.

FIG. 7 shows an embodiment of the static mixer used in the proposed process.

FIG. 8 shows an olive-shaped section reduction part at the mixing point of the components.

FIG. 9 shows a heating device comprising the static mixer of FIG. 7.

A process is proposed for hot application of an adhesive composition, in particular of a cross-linkable adhesive composition and notably of an adhesive composition which may cross-link with heat and/or which may cross-link with humidity. This adhesive composition may correspond to a pressure-sensitive adhesive (PSA) composition.

The adhesive composition to be applied is a silylated adhesive composition. The adhesive composition may thus correspond to the adhesive compositions described in document WO 2012/090151 A2, said at least one silylated pre-polymer for example being a polyurethane or a polyether comprising 2 hydrolyzable terminal groups of the alkoxysilane type. In particular, the adhesive composition to be applied comprises:

from 20 to 85% by weight, preferably from 30 to 75% by weight of said at least one silylated pre-polymer;
from 15 to 80% by weight, preferably from 25 to 70% by weight of said at least one compatible tackifying resin;
from 0.01 to 3% by weight, preferably from 0.1 to 2% by weight of at least one cross-linking catalyst.

Said at least one pre-polymer containing a silyl group and said at least one compatible tackifying resin belong to the main components of the adhesive composition to be applied. In other words, these components are the components of the composition indispensable for obtaining the adhesion performance. The silylated pre-polymer reacts with humidity, the reaction being promoted by the catalyst. In addition to the main components, the adhesive composition to be applied may thus comprise additives, such as the cross-linking catalyst (also known as curing catalyst) or further an anti-oxidant.

The catalyst promotes the cross-linking of the adhesive composition, and in particular the cross-linking of the silylated pre-polymer with humidity is referred to throughout this document as "cross-linking catalyst". As in the general case, the cross-linking catalyst should be distinguished from a cross-linking agent (also known as "curing agent"). Here, the silylated prepolymer reacting, particularly cross-linking, with humidity; water is a reagent which corresponds to the cross-linking agent of the silylated prepolymer. The cross-linking agent is consumed by the cross-linking reaction by being at least partly chemically combined with the cross-linked chains, forming three dimensional network. Accordingly, the cross-linking agent is not recovered at the end of the cross-linking reaction. In contrast, the cross-linking catalyst only promotes the cross-linking reaction. Said catalyst is not consumed by the cross-linking reaction, and it is not even partly chemically combined with the cross-linked chains.

The cross-linking catalyst used in the proposed hot application process can be any cross-linking catalyst known to a person skilled in the art for silanol condensation. Mention may be made as examples of cross-linking catalysts, of organic derivatives of titanium such as titanium acetyl acetonate (commercially available under the name TYZOR® AA75 from the company DuPont), aluminium such as aluminium chelate (commercially available under the name K-KAT® 5218 from the company King Industries), amines such as 1,8-diazobicyclo (5.4.0) undecene-7 or DBU.

The proposed hot application process is carried out by means of a hot application system. FIG. 5 shows a schematic illustration of an embodiment of the system 20. The elements common to FIGS. 1 and 5 have the same reference symbols.

The system 20 used for the proposed process notably differs from the system 100 of FIG. 1 in that it includes a dual supply of the supply line 88. This dual supply allows separation of the silylated pre-polymer and of the cross-linking catalyst before their application as a mixture by means of the proposed process. Thus, component 66, comprising at least the cross-linking catalyst, is separated from the component 68, comprising at least the silylated pre-polymer, until a mixer 30 positioned in the supply line 88. In other words, the mixer 30 is in-line and gives the possibility of carrying out a homogeneous mixing step of the components 66 and 68 separately supplied to the supply line 88. The injection of the component 66, comprising at least the cross-linking catalyst, into the main component 68, comprising at least the silylated pre-polymer, is carried out at the mixer 30, as illustrated, in order to allow immediate mixing of these components.

The mixer 30 is a difference between the system 20 illustrated in FIG. 5 and the system 100 illustrated earlier with FIG. 1 for which the main components are already assembled for forming the adhesive composition 80 in the storage reservoir 82. According to the proposed process, the components are at least partly separated into two distinct supplies for the supply line 88, the silylated pre-polymer being separated from the cross-linking catalyst. For example, the main component formed by the silylated pre-polymer may be separated from the components formed by the tackifying resin and the cross-linking catalyst, also, the main components formed by the silylated pre-polymer and the tackifying resin may be separated from the cross-linking catalyst. The components 66 and 68 may thus be separated partly, i.e. a group of components may be supplied separately from another group of components. Alternatively, the components may be totally separated, i.e. each component is separately supplied to the hot application system 20.

In every case, the separation of at least the silylated pre-polymer and of the cross-linking catalyst as defined earlier gives the possibility of acting against the chemical cross-linking reaction before gathering the components in the system 20. The chemical cross-linking reaction being impeded in each at least partly separated component, these components have greater stability: over time, to temperature and humidity. In other words, the proposed process allows the collection at a same system, here 20, of the mixture of the components 66 and 68 and the application of the adhesive composition; the stability of the components is improved.

The greater stability over time gives the possibility of maintaining the components for a longer time in storage between their production and their hot application.

Further, the greater stability of the components to temperature and to humidity facilitates hot application of the adhesive composition. Indeed, with reference to FIG. 5, the component 68 may be heated in the storage reservoir 82 by a heater 44, such as the melting plates illustrated earlier by FIGS. 2 to 4, without causing cross-linking of the component 68 because of the separation of the component 66, comprising at least the cross-linking catalyst. The heating in the storage reservoir 82, illustrated as a barrel, allows reduction in the viscosity of the component 68, for example comprising the silylated pre-polymer and the compatible tackifying resin, in order to facilitate pumping in the system 20, such as by means of a pump 46, before any contact with the separated component 66, for example comprising the cross-linking catalyst.

This heater 44 contributes to setting the application temperature of the component 68. The application temperature corresponds to a temperature where the adhesive composition to be applied has a sufficiently low viscosity for allowing application, in other words so-called coating, of the adhesive composition 80 on the surface 96. Indeed, after mixing the components 66 and 68, the adhesive composition is made up and may be hot-applied on the support 96 by means of an application nozzle 50. An application temperature for the adhesive composition 80 may thus correspond to a temperature where the viscosity of the adhesive composition is less than or equal to 20 Pa·s, preferably less than or equal to 10 Pa·s. As an example, the adhesive composition 80 may have a viscosity of 15±5 Pa·s at an application temperature from 100° C. to 120° C. Following the application of the adhesive composition 80 on the surface 96, the coated support 98 is subject to a controlled temperature, and optionally to a controlled humidity level, in order to allow cross-linking of the adhesive composition. The controlled temperature may be obtained by means of an oven or an enclosure. The controlled temperature corresponds to a temperature for cross-linking the adhesive composition 80 and is for example comprised between 50° C. and 200° C. More particularly, the cross-linking temperature is comprised between 80° C. and 160° C. or further comprised between 100° C. and 150° C.

In a similar way, the component 66 may also itself be heated before its mixing with the component 68 without any risk of cross-linking before their mixing.

The heating of the whole of the components 66 and 68 separated before their mixing gives the possibility of bringing these components to the application temperature without any risk of cross-linking before their mixing on the supply line 88 in the mixer 30, i.e. before the in-line mixing. The residence time of the adhesive composition obtained with the mixture is then reduced relatively to the residence time of said composition in the process applied in the system 100 of FIG. 1.

By allowing reduction in the hot residence time of the adhesive composition 80, the proposed process may achieve the setting of the application temperature of the adhesive composition 80, even in the case when the application temperature is included in the cross-linking temperature range of the adhesive composition 80. Depending on the provided application temperature included in the cross-linking temperature range, the hot residence time of the adhesive composition 80 in motion may then be adapted. The hot residence time of the adhesive composition in motion may notably be modulated with the flow rate of the adhesive composition 80 and the capacity of the supply line 88 from the mixing point of the separate components 66, 68 and the application nozzle 50. For example, for an adhesive composition 80 to be applied at 100° C. and having a cross-linking temperature range from 100° C. to 120° C. with cross-linking times from one to a few minutes (without additionally providing humidity), the flow rate of the in-line adhesive composition 80 may be adjusted so that the cross-linking reaction remains limited so as not to foul the system with cross-linked adhesive composition. The progression of the cross-linking reaction may be appreciated with reference to the conversion rate of the cross-linking reaction in the system, determined according to the following equation:

$$X = \frac{\dot{m}_o - \dot{m}_t}{\dot{m}_o} \quad (1)$$

wherein X is the dimensionless conversion rate;
$\dot{m}_0$ is the mass flow rate of non-cross-linked adhesive composition at the storage reservoir 82 in the form of a barrel;
$\dot{m}_t$ is the mass flow rate of non-cross-linked adhesive composition at the application nozzle 50.

The flow rate of the adhesive composition 80 in-line may thus be adjusted so that, according to the reaction kinetics and according to the temperature, the conversion rate of the cross-linking reaction for the adhesive composition remains less than or equal to 30%, preferably less than or equal to 10%. The flow rate of the adhesive composition 80 in the in-line heating device is for example comprised between 80 g·s$^{-1}$ and 170 g·s$^{-1}$, or about 5 to 10 kg per minutes, such as equal to 120 g·s$^{-1}$, i.e. about 7 kg per minute.

In order to allow mixing of the components with a high flow rate, the in-line mixer 30 may be adapted to very efficient mixing.

The mixer 30 may be a dynamic mixer 40 as illustrated in FIG. 6. Alternatively, FIG. 7 shows a perspective view of the internal structure of an embodiment of the mixer 30 as a static mixer 36. Static mixers are notably known for their use in the injection molding industry in order to homogenize the material before injecting it into a mould. The static mixer 36 on the supply line 88, i.e. in-line static mixer 36 comprises at least one mixing element having deflective surfaces 32 for deflecting the fluid, directed to obtaining a homogeneous mixture of the fluid over a short range and with low shearing. The mixing elements may have a surface density greater than or equal to 5*10$^3$ m$^{-1}$, preferably comprised between 5*10$^3$ m$^{-1}$ and 10*10$^3$ m$^{-1}$. The surface density corresponds to an amount of deflective surfaces per volume and is therefore expressed in m$^2$/m$^3$, i.e. in m$^{-1}$.

The static mixer 36 may further be provided with an olive-shaped part 52 at the injection point of the base component 66 in the supply line 88, as illustrated in FIG. 8. This olive-shaped part 52 reducing the free passage section 54 for the component 66 then locally increases the flow rate of the main component upon its mixing with the component 68 making it successively pass from laminar conditions, to intermediate or turbulent conditions upon passing through the olive-shaped part, facilitating dispersion of the component 66 in the component 68, and then to laminar conditions. This embodiment is particularly preferred when the component 66 comprises a cross-linking catalyst. Indeed, at the contact point, or at the mixing point, the cross-linking catalyst is locally found at a high concentration strongly increasing the reaction kinetics with the main component 68.

Local increase in the running speed may then allow limitation of the contact time, at the injection point, between the component 66 and the component 68 before their more homogenous mixing, and therefore less reactive locally. This local increase in the running speed of the component 66, such as the cross-linking catalyst, for example allows increase in the concentration of the cross-linking catalyst to be injected without fearing local cross-linking at the mixing point.

As illustrated in dashed lines in FIG. 7, the static mixer shows the whole of the mixing elements as comprising deflective surfaces 32 positioned in a sheath 34. The sheath 34 forms a conduit for circulating the adhesive composition 80. As the mixer 36 is positioned in-line, the sheath 34, as a circulation conduit of the mixer 36, is a portion of the supply line 88.

The static mixer 36 may have the particularity of including an electrically conducting material. In this document, by an electrically conducting material is meant a material having a resistivity of less than 10 $\Omega \cdot$m, preferably less than $10^{-} \Omega \cdot$m. This particularity gives the possibility of adding an induction heating function to the mixer 36. This addition of a heating function may also be achieved when the mixer is a dynamic mixer. However, the components 66 and 68 may be heated to the application temperature without any risk of cross-linking, the addition of the heating function particularly has the advantage of maintaining the application temperature at the mixer 36.

With reference to FIG. 9, the mixer 36 as a static mixer may partly be positioned in an in-line heating device 22, this device 22 comprising an inductive coil surrounding the static mixer. The in-line heating device is preferably positioned upstream from the mixing point (or contact point) of the components 66 and 68, a static mixer portion 36 being positioned downstream from the mixing point. The magnetic field generated by the inductive coil 26 surrounding the static mixer 36 is then able to induce an electric current, known as an eddy current or Foucault current, in the electric conductor of the static mixer 36. The eddy currents induced in the electric conductor cause heat generation by the Joule effect which diffuses to the adhesive composition 80 via the components of the static mixer 36. The inductive coil 26 is for example powered by means of an electric current of high frequency, preferably greater than or equal to 1 MHz, such as 15 MHz.

According to a preferred embodiment of the in-line heating device 22, the sheath 34 is in an electrically insulating material. In this document, by electrically insulating material is meant a material having a resistivity greater than or equal to $10^{6}$ $\Omega$.m. The insulating material of the sheath 34 is for example glass or a pre-polymer without any conductive fillers. According to this preferred embodiment, the mixing element 38 is produced from an electrically conductive material for allowing heating by induction of the static mixer 36. Indeed, as indicated earlier, the inductive coil 26 is able, with a supply of electric AC power to induce an eddy current in any electric conductor placed in the produced magnetic field.

Induction of the eddy currents is then directly achieved in the mixing element 38 at the deflective surfaces 32, and not at the sheath 34 placed between the inductive coil and the mixing element 38. By producing induction and a Joule effect at the deflective surfaces 32, it is possible to more efficiently heat the adhesive composition 80 which comes into direct contact with the deflective surfaces 32, without any intermediate.

According to a less advantageous embodiment, the sheath 34 is in an electrically conductive material, so that the eddy current induction only penetrates the sheath 34 and not the mixing element 38. The Joule effect then occurs at the sheath 34, and the heat is diffused into the adhesive composition 80 by conduction via the deflective surfaces 32. In this proposed less advantageous embodiment, heat exchange is less efficient because of the use of an intermediate for conducting the heat.

According to a preferred embodiment of the proposed process 20, the application nozzle 50 may also be heated. The heating of the application nozzle 50 then contributes to setting the application temperature of the adhesive composition 80. Thus, according to this embodiment, the application nozzle 50 is part of the heating device 22 at the application temperature. The heating of the application nozzle 50 gives the possibility of providing heat energy at the end of the supply line 88 for bringing the adhesive composition to the final application temperature. As this final application temperature is only reached at the end of the supply line 88, the residence time of this temperature is short, then limiting the risks of cross-linking of the adhesive composition. According to this embodiment, the main components 66 and 68 may be heated to a slightly lower temperature, for example by 10° C. or less, than the final application temperature. As the temperature of the adhesive composition 80 in the static mixer 30 is lower than the application temperature, the cross-linking duration at this temperature is shorter and the risks of in-line blocking are then further reduced.

Of course, the present invention is not limited to the examples and to the embodiments described and illustrated, but is susceptible to many alternatives accessible to one skilled in the art.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 13/63079, filed Dec. 19, 2013 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for hot application of an adhesive composition on a support, comprising employing a hot application system comprising:
   an application nozzle applying the adhesive composition,
   a supply line supplying the application nozzle with the adhesive composition to be applied in fluid form,
   a mixer positioned in the supply line homogeneously mixing main components of the adhesive composition before its application, wherein the mixer comprises, at an injection point of a cross-linking catalyst, a part reducing the free passage for said cross-linking catalyst to locally increase the flow rate of said cross-linking catalyst upon mixing;

wherein the mixer further comprises at least one mixing element having deflective surfaces positioned downstream from said injection point of the cross-linking catalyst, the applied adhesive composition including as main components:

from 20% to 85% by weight of silylated pre-polymer, from 15 to 80% by weight of compatible tackifying resin; and further comprising the cross-linking catalyst from 0.01 to 3% by weight;

the process comprising:

supplying the supply line with said at least silylated pre-polymer, separate from the cross-linking catalyst, injecting the cross-linking catalyst in the supply line at the injection point in the mixer, wherein the cross-linking catalyst is in intermediate or turbulent conditions upon passing through the part reducing its free passage at the injection point, wherein the mixture of the at least silylated pre-polymer and the cross-linking catalyst is in laminar flow in the mixer downstream from the injection point of the cross-linking catalyst, mixing the cross-linking catalyst with the at least silylated pre-polymer in the mixer, to form a mixed adhesive composition, heating the mixed adhesive composition, and applying the heated mixed adhesive composition on a support by the application nozzle.

2. The hot application process according to claim 1, wherein, upon supplying the supply line, the cross-linking catalyst is separated from the whole of the main components of the adhesive composition.

3. The hot application process according to claim 2, wherein the mixer is a static mixer.

4. The hot application process according to claim 3, wherein the static mixer includes an electrically conducting material, the hot application system comprising an in-line heating device, including an inductive coil surrounding a portion of the static mixer, the process comprising, prior to the hot application, heating of the adhesive composition up to the application temperature, by electrically powering the inductive coil of the in-line heating device.

5. The hot application process according to claim 4, wherein the adhesive composition is applied at a temperature comprised between 50° C. and 140° C.

6. The hot application process according to claim 2, wherein the adhesive composition to be applied cross-links with humidity.

7. The hot application process according to claim 2, wherein the adhesive composition is applied at a temperature comprised between 50° C. and 140° C.

8. The hot application process according to claim 1, wherein the mixer is a static mixer.

9. The hot application process according to claim 8, wherein the static mixer includes an electrically conducting material, the hot application system comprising an in-line heating device, including an inductive coil surrounding a portion of the static mixer, the process comprising, prior to the hot application, heating of the adhesive composition up to the application temperature, by electrically powering the inductive coil of the in-line heating device.

10. The hot application process according to claim 9, wherein the adhesive composition is applied at a temperature comprised between 50° C. and 140° C.

11. The hot application process according to claim 1, wherein the adhesive composition to be applied cross-links with humidity.

12. The hot application process according to claim 11, wherein the adhesive composition is applied at a temperature comprised between 50° C. and 140° C.

13. The hot application process according to claim 1, wherein the system comprises heater able to be positioned at a storage reservoir comprising at least one of the separate main components for raising said at least one main component to a pumping temperature.

14. The hot application process according to claim 13, wherein said at least one separate main component is raised to a pumping temperature comprised between 50° C. and 140° C.

15. The hot application process according to claim 1, wherein the adhesive composition is applied at a temperature comprised between 50° C. and 140° C.

* * * * *